9877X
R. Haynes,
Nail Extractor,
Patented July 2, 1836.
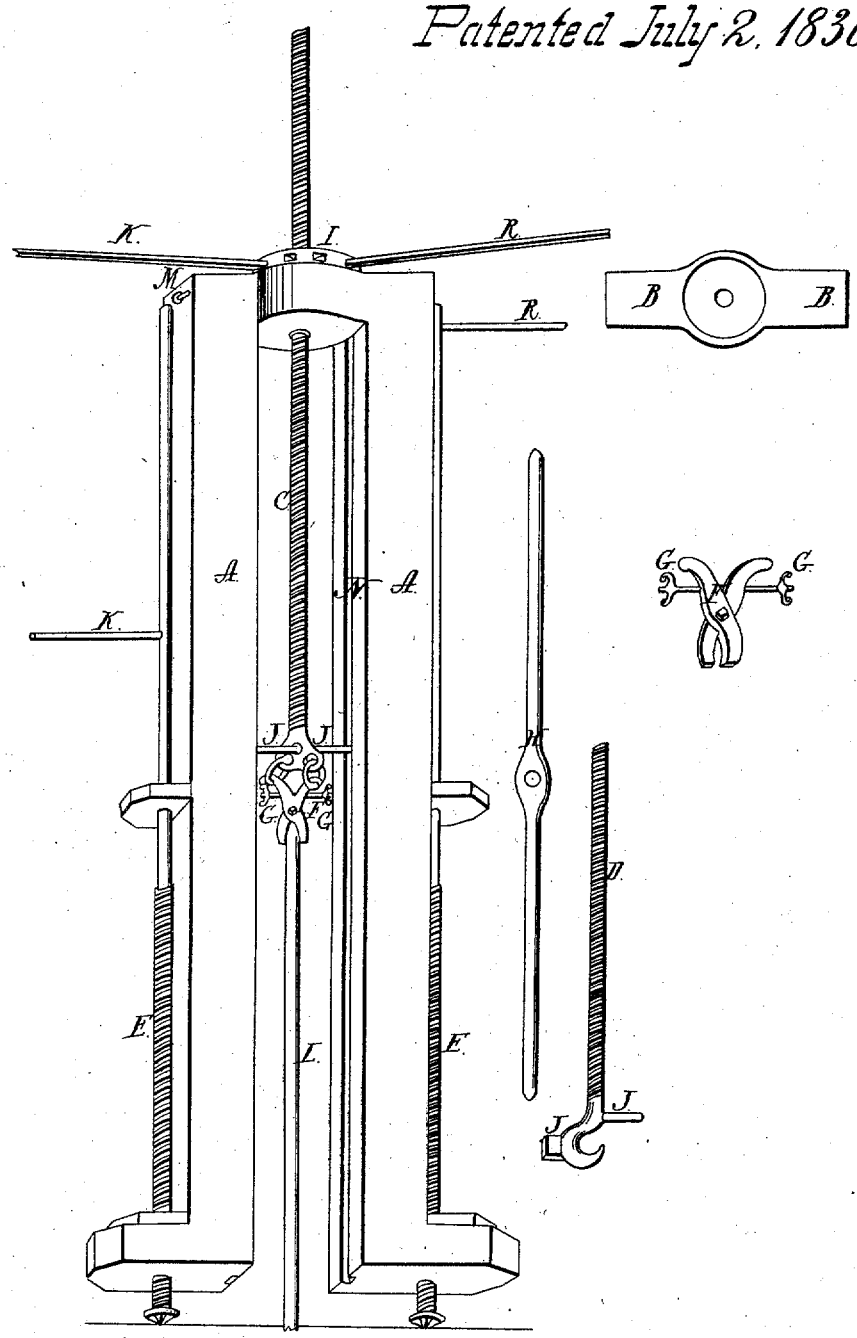
AM. PHOTO-LITHO. CO. N.Y. (OSBORNE'S PROCESS)

9877X July 2.1836 [illegible] 15 329

Richard Haynes
Letters Patent

The Schedule referred to in these Letters Patent and making part of the same
containing a description in the words of the said Richard Haynes himself of his
improvement in the machine for Drawing Bolts or Spikes.

---

To all to whom these presents shall come. Be it known that I Richard Haynes
of the Town of Portsmouth in the County of Norfolk and State of Virginia have inven-
ted a new and useful machine for Drawing bolts spikes [illegible] and that the follow-
ing is a full and exact description of the construction and operation of the said Machine
as invented by me. The machine should be constructed of wrought iron _ the principle
part is the frame formed by bending the bar in the middle at right angles, making
two parallel legs open at the bottom. This upright frame has attached two side screws
two drawing screws with their nut-heads and lever bars. A Forceps or Tongs with its
closing bolt & nut and two stays for the head of the frame. The frame _ Is a pair of
parallel legs open at the bottom and connected at the top at right angles (the top
being the middle part of the bar or piece which forms the whole frame) The top of the
frame is enlarged and pierced for the easy passage of the Drawing screw; which
enlargement is cup formed to receive the nut head of the drawing screw _ the better to
retain the said screw central. Diagonally on the upper and outside part of each leg)
an eye is formed or attached in which to hook the stays when necessary. Near the
centre on the outside on the outside of each leg) is projecting ear at right angles with
the leg of [illegible] and form to be pierced for the passage of the side screws. The
bottom of each leg is turned out at right angles corresponding with the ear & of the
said and pierced with a screw hole, for the lower part of the side screw to work in
Each leg is grooved its whole length from the bottom to the top on the inside for
the projections on the drawing screws to slide into. The stays may be simply [illegible]
hooked at one end and pointed at the other. The side screws. Are two bolts of
size & strength in proportion to the frame their lower halves are screwed to fit the
holes in the bottom of each leg; their lower extremities or feet are formed like a
large circular bolt head, in the centre of each is a pointed spur. Their upper
halves are plain and the size of the thread smaller than their lower halves
on on the plain part near the middle they are perforated for the reception of a lever
bar when necessary. They are riveted below and pass up through the foot and
rest alongside the frame to set or lengthen the same. If the base is level and
the frame of sufficient length these screws may be dispensed with. <u>The Draw-
ing screws</u>. are of two kinds. The first is a bolt of sufficient length cut with a
thread its extent; the lower extremity is formed with two eyes in each of which
hangs a single link. above and near the eyes and at right angles with them are
projections sufficiently long to enter and slide in the side grooves of the frame
when the screw is in its place through the top. This screw is for drawing plain
bolts, spikes, &c. The second is similar to the first except that instead of eyes
and links at its lower extremity it is there hook formed, and the projecting to
slide in the side grooves are placed in the direction of the hook. This screw is
for drawing Ring or eye bolts. The projections on these bolts made to fit in the
side grooves are necessary to keep the bolt &c central while operating and there-
by secure it from any unequal strain. <u>The nut heads</u>. Are also of two kinds.
The first is a nut of the proper size to fit the Drawing screws. and made with
lever arms of sufficient length to give the required power. This nut when appli-
ed will fit into the cup on the top of the frame. The second is a nut made also
to fit either drawing screw and the cup on top of the frame, but instead of arms
it is perforated like the barrel head of a crab or capstan for the reception of lever
bars. This nut is to be used when the situation of the object to be drawn pre-
cludes the application of the first as in a corner, near the side, floor &c. <u>The for-
ceps or Tongs</u>. Is a strong instrument shaped something like a Blacksmith's tongs
the jaws are concave within to receive the head of the bolt or spike &c. the lips are
slightly hollow and screw cut to nip firmly the bolt spike &c. The upper ends
of the shanks are turned out to form hooks. At a convenient distance below
these hooks, the shanks are enlarged and pierced in the direction of their clos-
ing for the reception of the closing bolt. <u>The closing bolt</u>. Is of a proportionate size
to the Tongs and of sufficient length to [illegible] by a hook to turn
the tongs on the head of the bolt, spike &c. and thereby get a nip (provided it
be otherwise destitute of a projecting or enlarged head.) The closing bolt has
a nut on each end to screw up on the tongs to close them. <u>Application</u>. If
the object to be drawn is close or on a level with the surface it will be necessary to is cut away sufficient wood around to admit the nose of the tongs. The tongs are applied to the head of the bolt, spike &c in a line with its direction and the nuts on the closing bolt screwed tightly together. Should the object be destitute of an enlarged head then handle the arms of the closing bolt and thereby turn the tongs on the bolt &c in the same manner as if it was a screw plate by which a head will be cut sufficient to hold firm. The tongs being adjusted set the frame over it so that the tongs extend up between its legs. If the base is irregular thereby preventing the frame from otherwise standing in a line with the tongs and object to be drawn adjust the side screws to regulate the legs so that the object is accomplished. Then if necessary hook in the stays at top and fasten them so as to steady the machine. The drawing screw is now lowered by its nut head so as to admit of placing the links at its lower end under the hooks of the tongs. (the projections being already in the side grooves) when done operate upon the nut head and the object must necessarily be drawn in a right line. If the object to be drawn is longer than the frame lengthen its legs the side screws. Should the object to be drawn be an eye or ring bolt, substitute the hook drawing bolt and dispense with the tongs. Hook the lower end into the eye or ring) and operate as before.

Witnesses
A. G. Bauff.
Patrick Gallagher

Richard Haynes

Ex.d [illegible]

1315 n.d.

Drawing (Patented July 2. 1836.)